(12) United States Patent
Brown et al.

(10) Patent No.: US 7,685,121 B2
(45) Date of Patent: Mar. 23, 2010

(54) STRUCTURE AND METHOD FOR MAINTAINING ORDERED LINKED LISTS

(75) Inventors: Robin L. Brown, Leominster, MA (US); Carl J. Lindeborg, Shrewsbury, MA (US); Hsiang-Tsung Kung, Lexington, MA (US); Jonnavithula Sreekanth, Acton, MA (US)

(73) Assignee: Emulex Corporation, Costa Mesa, CA (US)

( * ) Notice: Subject to any disclaimer, the term of this patent is extended or adjusted under 35 U.S.C. 154(b) by 414 days.

(21) Appl. No.: 10/268,178

(22) Filed: Oct. 10, 2002

(65) Prior Publication Data

US 2004/0073553 A1    Apr. 15, 2004

(51) Int. Cl.
    *G06F 17/30* (2006.01)
(52) U.S. Cl. .......................................... 707/6; 707/200
(58) Field of Classification Search .................. 707/3, 707/100, 102, 1, 6, 200; 370/328, 394, 469, 370/295, 395.72, 474; 711/136; 714/16; 709/228, 248, 204, 230; 713/502; 717/100, 717/116

See application file for complete search history.

(56) References Cited

U.S. PATENT DOCUMENTS

| | | | | |
|---|---|---|---|---|
| 5,278,834 A | * | 1/1994 | Mazzola | 370/469 |
| 5,319,778 A | * | 6/1994 | Catino | 707/102 |
| 5,838,957 A | * | 11/1998 | Rajaraman et al. | 713/502 |
| 5,859,974 A | * | 1/1999 | McArdle et al. | 709/204 |
| 5,950,191 A | * | 9/1999 | Schwartz | 707/3 |
| 6,327,644 B1 | * | 12/2001 | Beardsley et al. | 711/136 |
| 6,581,063 B1 | * | 6/2003 | Kirkman | 707/100 |
| 6,658,596 B1 | * | 12/2003 | Owen et al. | 714/16 |
| 2003/0108066 A1 | * | 6/2003 | Trippe | 370/474 |

* cited by examiner

*Primary Examiner*—Fred I Ehichioya
(74) *Attorney, Agent, or Firm*—Morrison & Foerster LLP

(57) ABSTRACT

A hierarchically-organized linked list structure have a first level comprised of sections of sequentially-ordered segments, and a second level comprised of representatives of each of said sections at the first level. A method for maintaining the hierarchically-organized linked list structure to facilitate segment insertion, retrieval and removal.

21 Claims, 4 Drawing Sheets

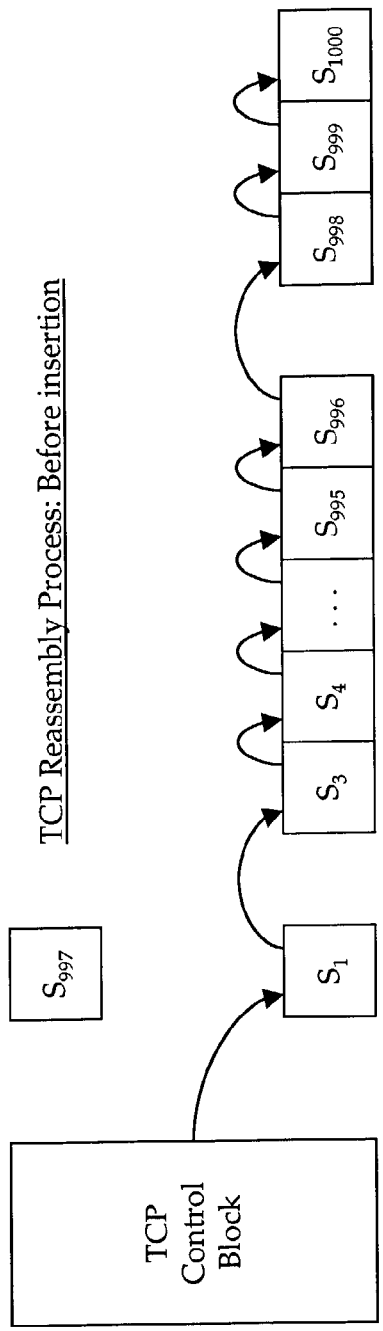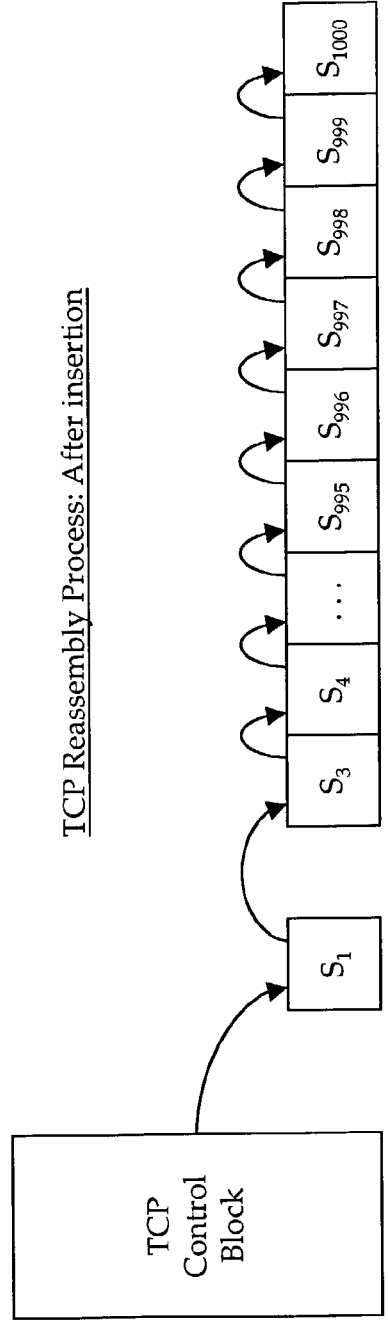

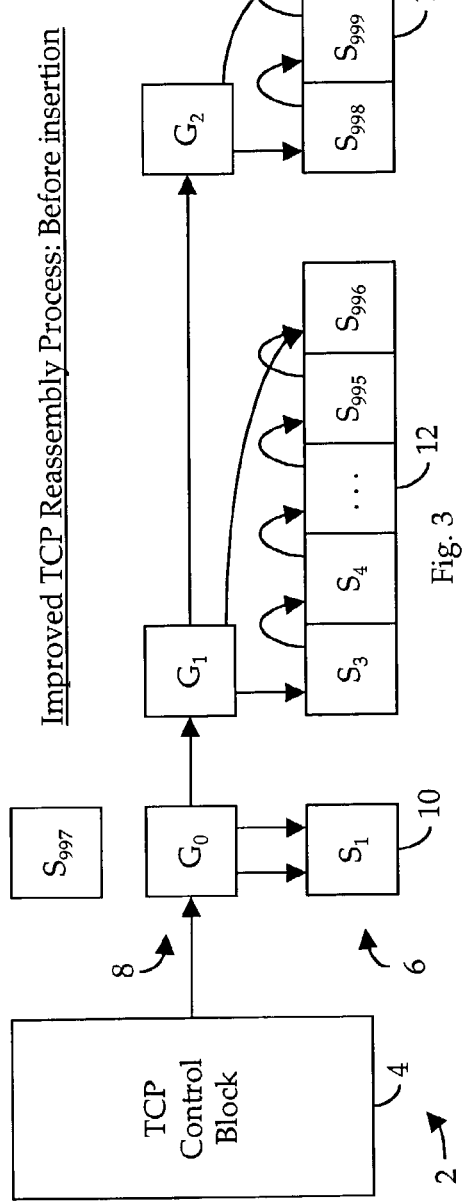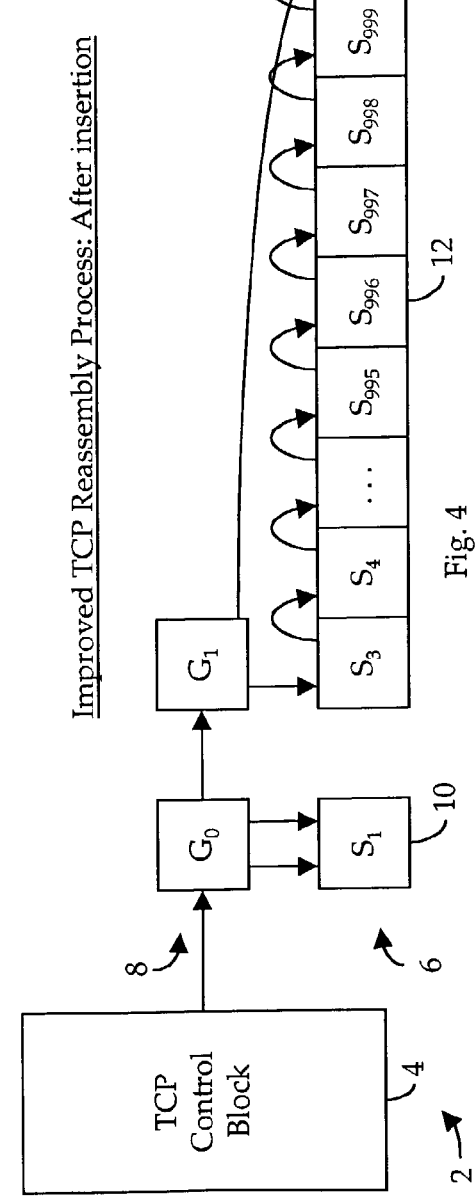

STRUCTURE AND METHOD FOR MAINTAINING ORDERED LINKED LISTS

BACKGROUND OF THE INVENTION

1. Technical Field

The present invention relates generally to digital data processing systems, and, in particular, to structures and methods in digital data processing systems for maintaining ordered linked lists.

2. Background Art

In general, in the descriptions that follow, we will italicize the first occurrence of each special term of art which should be familiar to those skilled in the art of digital data processing systems. In addition, when we first introduce a term that we believe to be new or that we will use in a context that we believe to be new, we will bold the term and provide the definition that we intend to apply to that term. Since our invention is specifically intended for use in digital data processing systems, we will often use terms that are well known to those skilled in this particular art. For example, with respect to an individual element of data stored at a particular address in a memory component of such a system, we will typically use the term pointer to refer, not to the element per se, but to a separate and distinct element that contains the address of the referenced element. For convenience of reference, we will use the term element hereafter to refer to both discrete data and more complex objects, records or the like which may be viewed as single logical entities.

From at least the 1940's, programmers of digital data processing systems have employed various logical structures to store, retrieve and maintain sets of elements. In one popular structure, the linked list, each member of the list is comprised, at a minimum, of two components: (1) the actual element itself (what we will refer to as the load), and (2) a forward link containing a pointer to the immediately succeeding member on the list (we call this member the forward member). Thus, for example, in a linked list containing three members, the first member (often called the head of the list) contains a forward link that points to the second member of the list; the second member contains a forward link that points to the third member of the list; and the third and last member of the list (often called the tail of the list) contains a null forward link, indicating that there are no other members of the list. Such a list is referred to as singly-linked, since an existing member of the list can be found only by searching or walking the list, starting at its head and proceeding towards its tail, until the desired member is found. If desired, each member can be expanded to include a third component: a backward link to the immediately preceding member of the list (we call this member the backward member). Such a list, commonly referred to as doubly-linked, can be walked from either direction as appropriate. In general, singly-linked lists are more memory efficient, while doubly-linked lists, in addition to being bi-directionally searchable, are less vulnerable to loss of continuity due to inadvertent damage to one of the link pointers. A doubly linked list has the additional advantage in that, in a system having a mechanism for selecting members that is independent of the list walking mechanism (e.g., a global search engine or a relational cross-referencing mechanism), the selected member's forward and backward link pointers can be used to remove the member from the list without invoking the list walking mechanism to identify the backward member (which is not visible to a member of a singly linked list).

In an ordered linked list, the sequential position of each member of the list is related to a selected characteristic of that member. For example, members can be ordered temporally (e.g., by some relevant time relationship), spatially (e.g., by some relevant physical relationship), or by context (e.g., by some relevant logical relationship). In such a list, the location or position at which each new member is to be added or inserted is a function of the ordering relationship. Once a singly-linked list has been walked to find the appropriate point of insertion, the insertion operation requires two steps: (1) the forward link of the backward member must be copied to the forward link of the new member; and (2) the forward link of the backward member must be updated to point to the new member. In a doubly-linked list, the insertion operation requires two additional steps: (1) the backward link of the forward member must be copied to the backward link of the new member; and (2) the backward link of the forward member must be updated to point to the new member.

For the purpose of this disclosure, let us define every ordered linked list as consisting of at least one section. By definition, a section is comprised of an ordered series of members representing a continuous sequence; a missing member in the sequence inherently breaks the list into two sections. Thus, a complete list consists of a single section, whereas an incomplete list consists of more than one section, each separated from the adjacent section(s) by a gap. One primary objective of our invention is to provide an improved method for more efficiently managing the reassembly of segments into sections, and the merging of sections into complete ordered linked lists.

In the discussion to follow, we shall refer to linked lists as being either weakly-ordered or strongly-ordered. When we refer to a list as being weakly-ordered list, we mean that the ordering relationship between members is a function of each member's load with respect to purely extrinsic criteria. Thus, for example, members may be ordered numerically based upon a particular numeric field within the load, but there is no expectation that the list will (or should) be continuous. Assume, by way of example, that in a linked list of a company's employees, the ordering relationship is a function of the load field containing the employee's social security number. Since the list clearly cannot contain all possible social security numbers, the list, even if so ordered, is only weakly so. In contrast, when we refer to a list as being strongly-ordered, we mean that the ordering relationship between members is a function of each member's load with respect to intrinsic criteria. Thus, for example, members may be ordered contextually based upon a particular text field within the load. Assume for this example that the linked list consists of short text segments, received over time (but not necessarily in proper order), of a considerably larger textual message—to be comprehended, not only must all segments be present, each must be in its proper contextual relationship with respect to all other segments. Thus, this list, as so ordered, is strongly so.

In general, the primary access point of a linked list is a header block which contains, at a minimum, a forward link containing the pointer to the member at the head of the list. In a doubly-linked list (and sometimes for convenience in a singly-linked list), the header block will also include a backward link containing the pointer to the member at the tail of the list. For convenience, the header block may contain other information related to the status of the list, such as the number of members currently on the list.

Transmission Control Protocol ("TCP") is a method used in combination with the Internet Protocol ("IP") to send data in the form of message units, called packets, between computers over the Internet. TCP is known as a connection-oriented protocol, which means that a connection is established and maintained until such time as the message(s) to be exchanged by the application programs at each end of the connection have been exchanged. While IP handles the actual delivery of the data, TCP keeps track of the individual packets into which a message is divided for efficient routing through the Internet. From a system perspective, TCP is responsible for ensuring, at the transmitting end of the connection, that a message is divided into packets that can be transmitted using IP, and, at the receiving end of the connection, for reassembling the packets received via IP back into the complete message. For example, when application data, such as a Web page, is transmitted from a content server, the TCP program layer (what we prefer to call the TCP transmitter) in that server converts the application data, in this case an HTML file, into a serial byte stream, sequentially numbers each byte, and then forwards segments of the now-numbered byte stream to the resident IP program layer (what we prefer to call the IP transmitter). In general, each segment includes sufficient byte sequencing and length information to enable reassembly of the respective piece of the byte stream into the original application data.

The IP transmitter encapsulates each segment into a respective IP packet for transmission via the Internet. Although each packet has the same destination IP address, it may get routed differently through the Internet, and, occasionally, may never arrive at the intended destination. At the receiving client server, the resident IP program layer (what we prefer to call the IP receiver) extracts the encapsulated segment and passes it to the resident TCP program layer (what we prefer to call the TCP receiver) for reassembly into the original byte stream. When an arriving segment contains bytes that are out of sequence with respect to the original byte stream, the TCP receiver will wait until all intervening bytes in the sequence have arrived before forwarding them to the application program. Thus, the application program is assured of receiving the application date in the original order, although not necessarily at a smooth or consistent rate of delivery.

The objective of TCP is to provide a reliable, connection-oriented delivery service. TCP views data as a stream of bytes, with each contiguous group of bytes being transferred as a separate and distinct segment; the exact number of bytes per segment is indicated in a respective field of the IP packet header. Data damage detection is handled by adding a checksum to each header. To provide the connection-oriented service, TCP takes care to ensure reliability, flow control, and connection maintenance. TCP is quite robust, being capable of recovering from data damage, loss, duplication, or out-of-sequence delivery. In order to do this, the TCP transmitter assigns a sequence number to each byte in each segment to be transmitted. For each segment received, the TCP receiver must return within a specified period an Acknowledge ("ACK") which includes the sequence number of the next expected byte. Under certain conditions, this same ACK may be retransmitted by the TCP receiver (thus becoming a so-called "duplicate ACK"). For example, if a segment is detected as damaged by the TCP receiver, it will discard the segment and return the duplicate ACK. Similarly, if a segment is detected as having been received out of sequence, the TCP receiver will send the duplicate ACK. In both cases, upon receiving the duplicate ACK, the TCP transmitter will automatically resend the segment containing the byte having the indicated sequence number.

In a typical TCP receiver, a reassembly process reassembles a multi-segment message using a linked list that is a strongly ordered as a function of the sequence numbers assigned by the TCP transmitter. When out-of-order segments are received, the reassembly process first validates and then inserts each validated segment into the list at the proper position. The reassembly process will deliver a segment only after having determined that the segment is valid and the byte sequence contained therein is in order with respect to earlier-delivered segments.

By way of example, we have illustrated in FIG. 1 a typical instantiation of the TCP reassembly process as practiced on a digital data processing system incorporating a conventional, commercially available microprocessor, such as the Pentium® 4 from Intel Corporation. As of the instant illustrated, the TCP reassembly process has received, validated and linked a total of 998 segments onto the TCP segment list. We will assume for the purposes of this example that each segment has a load of 100 bytes. Thus, as of the illustrated instant, the segment list consists of 3 sections: a first section consisting of only segment $S_1$ (containing bytes 1 through 100); a second section consisting of segments $S_3$ (containing bytes 201 through 300) through $S_{996}$ (containing bytes 99501 through 99600); and a third section consisting of segments $S_{998}$ (containing bytes 99701 through 99800) through $S_{1000}$ (containing bytes 99901 through 100000). In this not-unusual example, segment $S_2$ (containing bytes 101 through 200) has either been rejected (e.g., because it failed the checksum validation test) or it simply failed to arrive (e.g., it got lost somewhere in the Internet), and the TCP reassembly process is awaiting retransmission. Segment $S_{997}$ (containing bytes 99601 through 99700), on the other hand, has just arrived and been validated, and is awaiting insertion into the TCP segment list.

To accomplish insertion of segment $S_{997}$, the TCP reassembly process must first access the TCP control block to retrieve the forward link to the first segment on the TCP segment list, namely segment $S_1$. Since the ending sequence number of this first segment plus 1 (i.e., "101") is not equal to the starting sequence number of the new segment (i.e., "99601"), the TCP reassembly process will walk to the next segment on the list, namely segment $S_3$. Since the ending sequence number of this second segment plus 1 (i.e., "301") is still not equal to the starting sequence number of the new segment (i.e., "99601"), the TCP reassembly process will continue the walk to the next segment on the list, namely segment $S_4$. The TCP reassembly process will continue walking the list in this manner until segment $S_{996}$ is reached. Since the ending sequence number of this segment plus 1 (i.e., "99601") is equal to the starting sequence number of the new segment (i.e., "99601"), the TCP reassembly process will terminate the walk, and insert the new segment between segments $S_{996}$ and $S_{998}$ using the singly-linked list insertion operation described above. Accordingly, as shown in FIG. 2, the TCP segment list, after the insertion operation has been performed, will consist of only two sections: the first section still consisting of only segment $S_1$ (containing bytes 1 through 100); and the second section which now consists of segments $S_3$ through $S_{1000}$ (containing, in total, bytes 201 through 100000). As you can see, the TCP reassembly process had to access a total of 995 list members before finding the correct insertion point.

Although this example may appear to be a worst case scenario, it is, in fact, not that unusual. Given that many messages are quite long, comprising hundreds or, perhaps, thousands of segments and that the Internet is getting more and more congested, the reassembly process can be a very compute intensive operation and current implementations tend to be too inefficient for high-speed networks. With the recent introduction of multi-giga-bit-per-second Ethernet communication networks, the potential rate of delivery is so high that even an occasional loss/damage of a packet may exceed the capabilities of the client servers to manage the rapidly-accumulating out-of-order segments while awaiting retransmission of the lost/damaged segment. We submit that what is needed is a more efficient method for maintaining ordered linked lists, particularly for use in such applications as the TCP reassembly process.

BRIEF DESCRIPTION OF THE SEVERAL VIEWS OF THE DRAWINGS

Our invention may be more fully understood by a description of certain preferred embodiments in conjunction with the attached drawings in which:

FIG. 1 is a block representation of a prior art TCP reassembly process, before insertion of a new segment;

FIG. 2 is a block representation of the prior art TCP reassembly process shown in FIG. 1, but after insertion of the segment;

FIG. 3 is a block representation of an improved TCP reassembly process adapted according to the preferred embodiment of our invention, before insertion of a new segment;

FIG. 4 is a block representation of the improved TCP reassembly process shown in FIG. 3, but after insertion of the segment;

Figure 5:
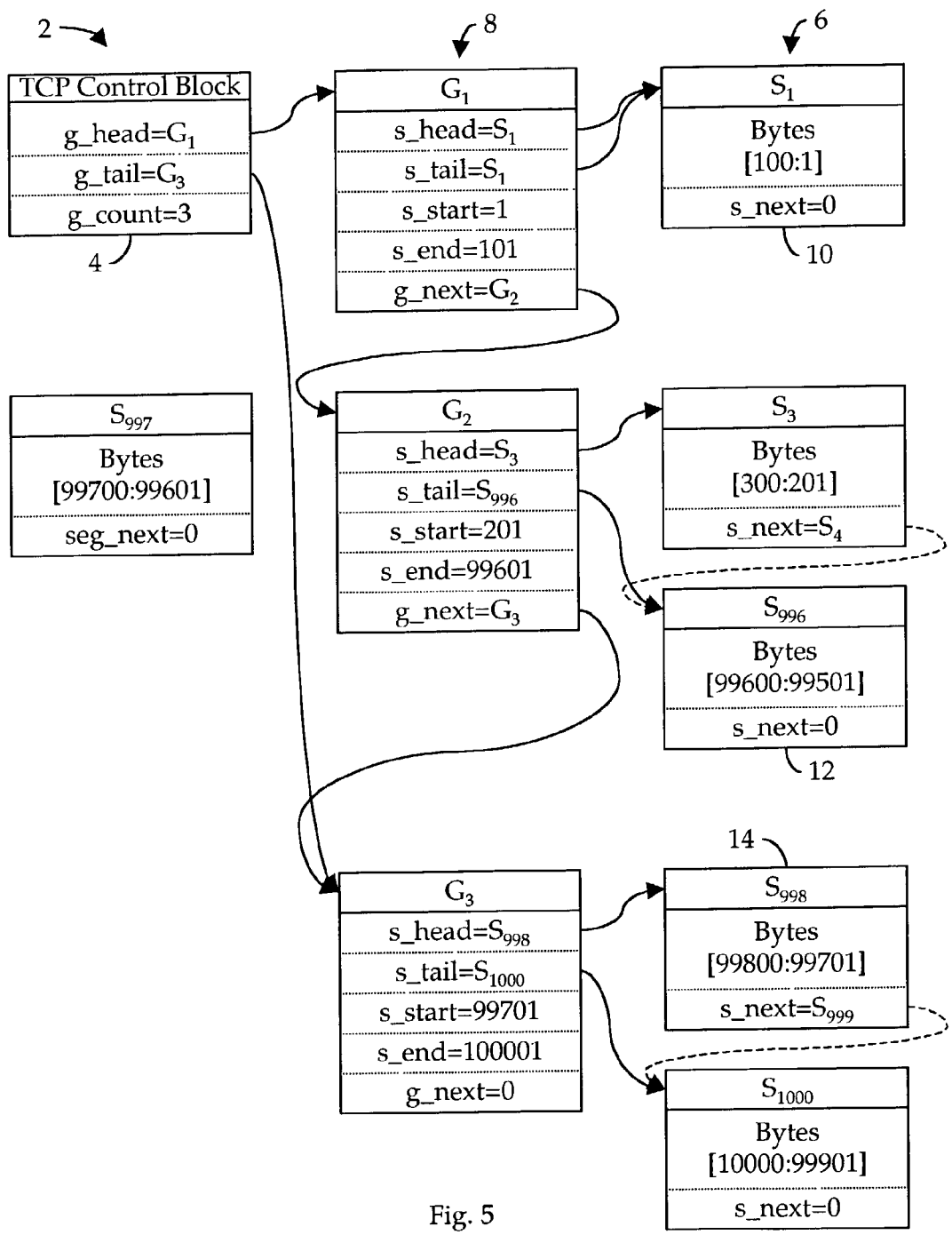
FIG. 5 is a schematic representation of the TCP segment list as of the initiation of the reassembly process as shown in FIG. 3.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

In accordance with the preferred embodiment of our invention, we reorganize the TCP segment list 2 into a TCB control block 4 and a hierarchically-organized linked list structure having two levels: a lower, segment management level 6, and an upper, section management level 8. At the segment management level 6, each member, $S_x$, is comprised of a respective one of the segments of the traditional TCP segment list. For the example shown in FIG. 3, which corresponds to the "before" example shown in FIG. 1, our segment management level 6 consists of three sections: a first section 10 consisting of only segment $S_1$ (containing bytes 1 through 100); a second section 12 consisting of segments $S_3$ through $S_{996}$ (containing, in total, bytes 201 through 99600); and a third section 14 consisting of segments $S_{998}$ through $S_{1000}$ (containing, in total, bytes 99701 through 100000). In contrast, however, to the prior art TCP segment list structure shown in FIG. 1, each section of our segment management level 6 is decoupled from the adjacent section(s) (i.e., as shown in FIG. 5, the forward links, s_next, of segments $S_1$ and $S_{996}$ are null) thus making it impossible to walk from one section to the next using a conventional reassembly process.

At the section management level 8, each member, $G_x$, contains, at a minimum: a forward link to the first member of a respective one of the sections at the segment management level 6, to facilitate efficient prepending of a new segment at the head of the respective section; and a forward link to the immediately succeeding member, if any, at the section management level 8. In our preferred embodiment, each member at the section management level 8 further includes a backward link to the last member of the respective section at the segment management level 6, to facilitate efficient appending of new segments at the tail of the respective section. In addition, we recommend that each member of the section management level 8 include the starting sequence number of the segment at the head of the respective section at the segment management level 6 and the ending sequence number plus 1 of the segment at the tail of the respective section at the segment management level 6, to facilitate efficient walking of the section management level 8 using a process we will describe below. In effect, each member, $G_x$, represents at the section management level 8 a respective one of the sections at the section management level 8.

In the example shown in FIG. 5, our TCB control block 4 contains a forward link, g_head, that points to the member, $G_1$, at the head of the section management level 8, and, preferably, a backward link, g_tail, to the member, $G_3$, at the tail of the section management level 8. For convenience, our TCB control block 4 also includes the number, g_count, of members at the section management level 8, which in this example is 3.

At the section management level 8, the first member, $G_1$, contains a forward link, s_head, that points to the member, $S_1$, at the head of the first section 10, and, preferably, a backward link, s_tail, that points to the member, also $S_1$, at the tail of the first section 10. Member $G_1$, also includes the starting sequence number, s_start, of the member at the head of the first section 10, namely "1", and the ending sequence number (plus 1), s_end, of the member at the tail of the first section 10, namely "101". Finally, member $G_1$ includes a forward pointer to the immediately succeeding member, $G_2$, of the section management level 8.

The second member, $G_2$, contains a forward link, s_head, that points to the member, $S_3$, at the head of the second section 12, and, preferably, a backward link, s_tail, that points to the member, $S_{996}$, at the tail of the second section 12. Member $G_2$ also includes the starting sequence number, s_start, of the member at the head of the second section 12, namely "201", and the ending sequence number (plus 1), s_end, of the member at the tail of the second section 12, namely "99601". Finally, member $G_2$ includes a forward pointer to the immediately succeeding member, $G_3$, of the section management level 8.

Finally, for this example, the third member, $G_3$, contains a forward link, s_head, that points to the member, $S_{998}$, at the head of the third section 14, and, preferably, a backward link, s_tail, that points to the member, $S_{1000}$, at the tail of the third section 14. Member $G_3$ also includes the starting sequence number, s_start, of the member at the head of the third section 14, namely "99701", and the ending sequence number (plus 1), s_end, of the member at the tail of the third section 14, namely "100001". Finally, the forward link, g_next, of member $G_3$ is null, indicating that there are no more members at the section management level 8.

To accomplish addition of new segment $S_{997}$, to the TCP segment list 2, our TCP reassembly process first accesses the TCB control block 4 to retrieve the forward link, g_head, to the first member, $G_1$, at the section management level 8. Retrieving $G_1$, we compare the starting sequence number of the new segment, i.e., 99601, to the starting sequence number and the ending sequence number (plus 1) of the first section 10, i.e., 1 and 101, respectively, and determine that the new segment can be neither prepended nor appended to the first section 10. Our TCP reassembly process will then walk to the second member, $G_2$, at the section management level 8. Retrieving $G_2$ we compare the starting sequence number of the new segment, i.e., 99601, to the starting sequence number and the ending sequence number (plus 1) of the second section 12, i.e., 201 and 99601, respectively, and determine that the new segment can be appended to the second section 12. Descending to the segment management level 6, the actual appending operation is substantially identical to the conventional TCP reassembly process described above. Ascending back to the section management level 8, our TCP reassembly process walks to the next member, $G_3$. Retrieving $G_3$, we compare the new ending sequence number (plus 1) of the second section 12, i.e., 99701, to the starting sequence number of the third section 14, i.e., 99701, and determine that the third section 14 can now be appended, as a whole, to the second section 12. Descending back to the segment management level 6, the actual appending operation is substantially identical to the conventional TCP reassembly process described above. Upon ascending once again to the section management level 8, our TCP reassembly process will discard member $G_3$ by first copying the values of both s_tail and s_end from $G_3$ into the corresponding fields of $G_2$, then nulling $G_2$'s g_next link, and finally, releasing the memory space occupied by the member $G_3$.

Figure 6:
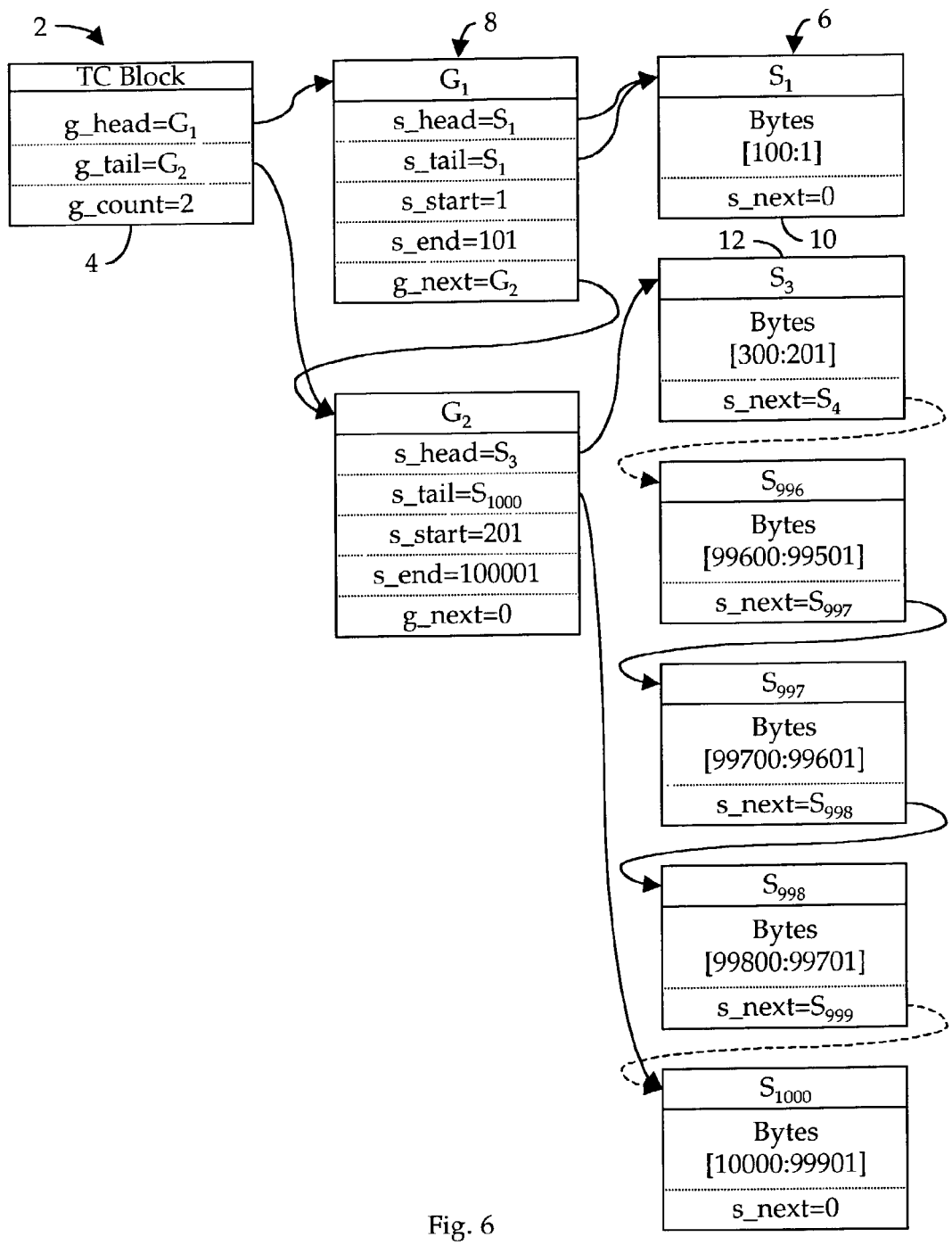
FIG. 6 is a schematic representation of the TCP segment list as of the completion of the reassembly process as shown in FIG. 4.

Accordingly, as shown in FIG. 6, the TCP segment list 2, after the segment insertion and section merging operations have been performed, will consist of only two sections: the first section 10 still consisting of only segment $S_1$ (containing bytes 1 through 100); and the second section 12 which now consists of segments $S_3$ through $S_{1000}$ (containing, in total, bytes 201 through 100000). As you can see, our TCP reassembly process had to access a total of only 2 members at the section management level 8 before finding the correct insertion point, and at most a third member to merge adjacent sections at the section management level 8. The actual insertion operations themselves are substantially the same in both the conventional TCP reassembly process and our TCP reassembly process. However, the total number of memory accesses and comparison operations is very significantly less that in the conventional TCP reassembly process described above in conjunction with FIG. 1 and FIG. 2.

From a system perspective, our hierarchically-organized linked list structure is designed to compactly summarize in each member, $G_x$, at the section management level 8 the essential relative ordering information of a respective one of the sections at the segment management level 6 vis-á-vis the adjacent segment(s). Providing this information at the section management level 8 greatly facilitates the insertion operation by eliminating the need to walk arbitrarily-long sections to retrieve this same information. This same structure can be used to more efficiently search for and retrieve a particular member of a section at the segment management level 6. Once a desired member has been found, it can, if desired, be removed from the section in which it is a member, generally using the techniques described above; if it is at neither the head nor tail of a section, then the section can be easily split into two smaller sections, and a representative member created for each at the section management level 8. We wish to emphasize, however, that, although we prefer to store the relative ordering information for each of the segment lists in the respective one of the members at the section management level 8, if desired, this information can be stored in a header area set aside for this purpose in the segment at the head of each segment list; provision must be made, of course, to transfer this information in the event that, as a result of a prepend or merge operation, a new segment becomes the head of the respective segment list. As a whole, our list structure and related list maintenance method is significantly more efficient, on average, than conventional list structures and methods, both in terms of compute workload and memory bandwidth.

Thus it is apparent that we have provided a structure and method for efficiently maintaining ordered linked lists. In particular, we have disclosed a structure and method for maintaining a hierarchically-organized linked list in which each member at a first level which represents a section of a linked list at a lower level. Those skilled in the art will recognize that modifications and variations can be made without departing from the spirit of our invention. Therefore, we intend that our invention encompass all such variations and modifications as fall within the scope of the appended claims.

What we claim is:

1. In a packet-based communication system comprising a processor, a method for maintaining a linked list comprised of members ordered with respect to a predetermined ordering relationship, each member corresponding to a packet, for reassembling received packets into a message, the method comprising:
  maintaining a plurality of first linked lists decoupled from each other, each comprised of a plurality of members continuously ordered with respect to said ordering relationship;
  maintaining a second linked list different from any of the plurality of first linked lists, the second linked list comprised of a plurality of members, each of which includes starting and ending sequence numbers of a respective one of said plurality of first linked lists; and
  walking through one or more members of the second linked list and comparing by the processor a starting sequence number of a segment to at least one of the starting and ending sequence numbers stored in each member of the second linked list to determine an appropriate first linked list from which to insert or remove the segment,
  wherein each member of said second list is comprised of: either a forward link to a next succeeding member of said second list or a null forward link; and a field representing the relative relationship of said respective one of said first lists with respect to said ordering relationship.

2. The method of claim 1 wherein, in each of said first lists, each member is comprised of a load and either a forward link to a next succeeding member of said first list or a null forward link.

3. The method of claim 2 wherein, in each of said members of said first list, said forward link is comprises a null forward link in the absence of a next succeeding member of said first list.

4. The method of claim 1 wherein each member of said second list is comprised of either a forward link to a next succeeding member of said second list or a null forward link.

5. The method of claim 4 wherein, in each of said members of said second list, said forward link is comprises a null forward link in the absence of a next succeeding member of said second list.

6. The method of claim 4 wherein each member of said second list is further comprised of a forward link to a first member of said respective one of said first lists.

7. The method of claim 4 wherein each member of said second list is further comprised of a backward link to a last member of said respective one of said first lists.

8. The method of claim 4 wherein each member of said second list is further comprised of a starting sequence number of said first member of said respective one of said first lists.

9. The method of claim 4 wherein each member of said second list is further comprised of an ending sequence number of said last member of said respective one of said first lists.

10. The method of claim 1 wherein each member of said first list is comprised of:
   a forward link to a next succeeding member of said first list or a null forward link; and
   a field representing the relative relationship of said first lists with respect to said ordering relationship.

11. The method of claim 1 further comprising:
   maintaining a control block comprising a forward link to a first member of said second list.

12. The method of claim 11 wherein said control block further comprises a backward link to a last member of said second list.

13. In a digital packet-based data processing system having a memory component, an ordered linked list structure of members resident in said memory component, each member corresponding to a packet, the ordered linked list structure for reassembling received packets into a message, the ordered linked list structure comprising:
   a plurality of first ordered linked lists decoupled from each other, wherein, in each of said first ordered linked lists, the members are ordered in a continuous sequence, each member comprising a forward link to a next succeeding member of said first list or a null forward link; and
   a second ordered linked list different from any of the plurality of the first ordered linked list, the second ordered linked list having a plurality of members, wherein each member contains starting and ending sequence numbers of the a respective one of said plurality of first ordered linked lists, the starting and ending sequence numbers usable to determine an appropriate first ordered linked list from which to insert or remove a segment, wherein each member of said second list is comprised of a forward link to a next succeeding member of said second list or a null forward link.

14. The structure of claim 13 wherein, in each of said member members of said first list, said forward link is has a null forward link in the absence of a next succeeding member of said first list.

15. The structure of claim 13 wherein, in each of said member members of said second list, said forward link is has a null forward link in the absence of a next succeeding member of said second list.

16. The structure of claim 13 wherein each member of said second list is further comprised of a forward link to a first member of said respective one of said first lists.

17. The structure of claim 13 wherein each member of said second list is further comprised of a backward link to a last member of said respective one of said first lists.

18. The structure of claim 13 wherein each member of said second list is further comprised of a starting sequence number of said first member of said respective one of said first lists.

19. The structure of claim 13 wherein each member of said second list is further comprised of an ending sequence number of said last member of said respective one of said first lists.

20. The structure of claim 13 further comprising:
   a control block comprising a forward link to a first member of said second list.

21. The structure of claim 20 wherein said control block further comprises a backward link to a last member of said second list.

* * * * *